Dec. 10, 1968 D. G. BERGHAUS ET AL 3,416,148

COMPOUND RADIUS TRANSDUCER HEAD

Filed Dec. 23, 1964

INVENTORS
DONALD G. BERGHAUS
ALBERT N. GARTHWAITE
HUI-LI TIAO

BY John F. Ostendorf

ATTORNEY

United States Patent Office 3,416,148

Patented Dec. 10, 1968

3,416,148

COMPOUND RADIUS TRANSDUCER HEAD

Donald G. Berghaus and Albert N. Garthwaite, Poughkeepsie, and Hui-Li Tiao, Wappingers Falls, N.Y., assignors to International Business Machines Corporation, New York, N.Y., a corporation of New York Filed Dec. 23, 1964, Ser. No. 420,602
9 Claims. (Cl. 340—174.1)

ABSTRACT OF THE DISCLOSURE

A transducer capable of generating a fluid bearing for supporting a tape moved thereover at a predetermined spacing $h^*$ from the operating surface. The operating surface has a compound radius of curvature including a small radius entry region for establishing a bearing of the desired thickness and a larger radius portion which includes the processing zone of the transducer for maintaining the bearing stability without necessitating large wrap angles.

This invention relates to transducer apparatus and, more particularly, to flexible record media transducing heads having operating surfaces with multiple radii characteristics.

Conventional fluid foil bearing transducer heads ordinarily have operating surfaces (at which the working gaps between pole pieces of the transducer are positioned) with substantially constant radii of curvature. The particular fluid cushion or bearing is obtained by relating the geometry of the head to the velocity of movement of the record media with respect to the head, the tension of the media as it passes the head and the angle of wrap of the tape to the head and the viscosity of the fluid medium. In this way, recording or reading of information from the media takes place with virtually no contact between the head structure and the record media. Difficulties occur, however, in maintaining a constant fluid film over the arc length of the head structure containing the transducing means. This portion of the structure may be considered the processing zone and the uniformity of separation in this zone is critical. If the separation is not uniform and constant in time, transduced signal distortion takes place, which is particularly noticeable when the recording media travel direction is reversed.

Accordingly, it is a primary object of the invention to provide improved transducer head apparatus.

It is another object of the invention to provide transducer head apparatus which provides a small constant foil bearing over the entire transducing portion of the head apparatus thereby eliminating wear of both head structure and record media.

A further object of the invention is to provide tape transducing apparatus having a particular geometry to accomplish reading and recording of information by forming a predetermined fluid foil bearing of the tape with respect to the apparatus.

In some tape transport systems it is not possible to provide a large wrap angle for the flexible record media with respect to the head structure in order to obtain a stable fluid film or bearing over a head. This influences the signals obtained from the transducing apparatus.

It is a further object of the invention to provide transducer head apparatus which produces substantially constant transduced signals by controlling the manner of traversing the head by the record media.

Still another object of the invention, therefore, is to provide a flexible record media transport system, including transducer apparatus, which accommodates all of the parameters of the transport system, including the angle of wrap, tension on the record media and its velocity of movement in traversing the transducing apparatus.

Briefly, the foregoing objects are accomplished by providing transducer head apparatus of the foil bearing type. The apparatus comprises a head structure, disposed in a fluid medium and formed of pole pieces which define a transducing gap. The operating surface of the head structure is characterized by including at least entry and transducing portions. The portions have different radii of curvature with the radius of the entry portion smaller than the portion of the structure containing the transducing gap.

According to one feature of the invention, the contour of the surface traversed through a foil bearing by a record media is formed so as to accommodate movement of the media in either direction across the transducing gap. The radius of curvature of the entry portion of the head structure for movement of the media in either direction is smaller than the radius of curvature of the portion of the head structure containing the transducing gap. The entry radii are not required to be equal, but may be unequal to accommodate different media speeds in the directions of movement, provided that the exit and entry angles of the media are also unequal.

According to another feature of the invention, a transducer head structure is provided having plural transducing gaps positioned in the structure in tandem with respect to each other. At least two radial portions are provided in the head structure with the media entry portion having a radius to form a foil bearing for traversing the other portion containing the transducing gap.

The foregoing and other objects, features and advantages of the invention will be apparent from the following more particular description of preferred embodiments of the invention, as illustrated in the accompanying drawing; wherein.

Figure 1:
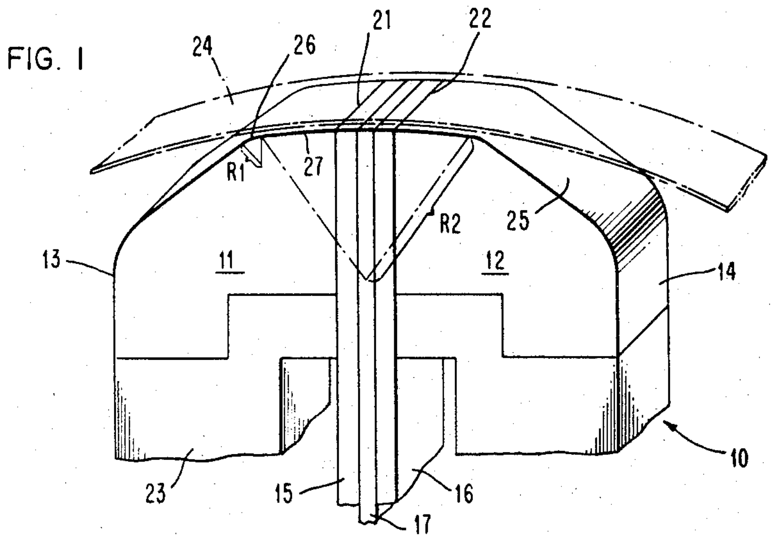
FIGURE 1 is a partial perspective view of a transducer head structure embodying the principles of the invention and having a record media in phantom traversing the structure.

Referring now to FIG. 1, the principles of the invention may be embodied in a substantially conventional two transducing gap head structure 10. This structure may comprise a read transducing portion 11 and a write transducing portion 12 formed of the ferrite pole pieces 13, 15 and 14, 16, respectively. The two head portions 11 and 12 are separated by a shield 17. Shield 17 may be made of alternate laminations of copper and mu metal.

Together the pole pieces 13 and 15 define a read transducing gap 21. Similarly, the pole pieces 14 and 16 define a write transducing gap 22. The various coils and electrical connecting elements for connection to the transducer apparatus may be contained in a potting compound which is partially shown at 23.

The apparatus of FIG. 1 is intended to transduce signals from a record media such as the magnetic tape 24, which is shown in phantom as traversing the contoured operating surface 25 of the head structure. The tape traverses the head on a fluid foil bearing which is formed between the surface 25 of the head structure 10 and the tape 24. The spacing of this bearing is formed in a first or media entry region of the head. This region is indicated at 26 as having a radius R1. The bearing between the head structure and tape is maintained in a large radius region indicated at 27 as having a radius R2.

Region 27 is the transducing region or processing zone of the head structure and contains the transducing gaps 21 and 22.

The theory for the development of such a fluid foil bearing has been described in copending application Ser. No. 74,150 filed Dec. 6, 1960, (now U.S. Patent 3,170,045) in the means of H. K. Baumeister et al. and assigned to the same assignee as this invention. As taught in the aforementioned Baumeister et al. patent, the thickness or spacing of the bearing may be determined from the following formula:

$$(1) \qquad 0.642 = \frac{h^*}{R}\left(\frac{T}{6\mu V}\right)^{3/2}$$

wherein $h^*$ is the air film thickness, T is the tape tension, $\mu$ is the viscosity of the fluid medium such as air, V is the tape velocity and R is the radius of the head structure.

In the invention of that application, the radius of curvature of the transducer head structure is constant, and the bearing thickness as determined by the single radius value. This thickness is only maintained constant if the bearing exists over an appreciable arc length along the operating surface and if the arc length is too short it is not posible to maintain a constant air bearing over the surface of the head structure. This affects the wear properties of the tape and head structure as well as the character of the signals transduced by the apparatus. Sufficient arc length may be achieved by employing large radii or by wrapping the tape at substantial wrap angle over smaller radii. This is not a satisfactory solution in many cases, however, since the use of large radii create large separation values $h^*$ as indicated by the above formula. When smaller radii are used to allow smaller separation values, the large wrap angles necessary to lend stability to the bearing complicate the tape path and cannot always be tolerated.

By employing a small radius region 26 as the entry radius for a record tape 24, this invention eliminates these problems. The fluid foil bearing which is generated remains substantially constant over the entire arc 27 having the larger radius. In this region, a constant pressure occurs at all points of the head surface to maintain the substantially constant bearing. This condition occurs since the pressure is equal to the tension per unit width of the tape as it passes over region 27 divided by the radius R2 of this region of the surface.

In the large radius region, wear is eliminated from the surface of the head structure 10 and from the tape 24 as it traverses the structure, due to the low pressure. As a result, the materials employed in the surface 27 are not required to be highly resistant to wear. In addition, since the generated fluid film is constant over the entire arc length of region 27, the transduced signals are also constant, and since the thickness of the fluid bearing is relatively small, a large signal results.

Figure 2:
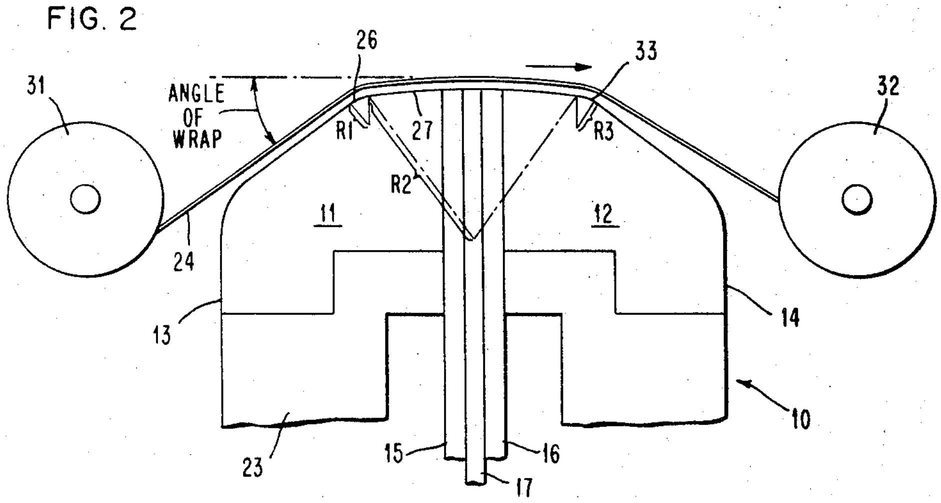
FIGURE 2 is an end view of the head structure of FIG. 1 showing a tape media connected in a tape transport system.
Figure 3:
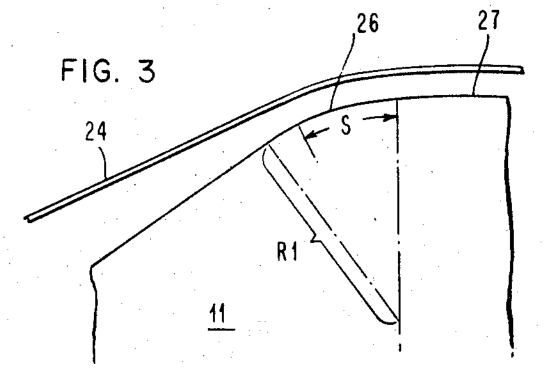
FIGURE 3 is a partial end view of the head structure of FIG. 1 showing the entry radial portion in greater detail.

It has been stated that this invention also finds particular application where the transducer head apparatus is employed in tape transport systems having a small angle of wrap. As shown in FIG. 2, the angle of wrap is the angle between the tape at a point where it begins to follow the contour of the head and the tangential component of the tape at the transducing gaps. If the angle of wrap is small, the arc length of wrap on the surface of the transducing apparatus is also small, this arc length is defined as being that portion of the arc of curvature of the tape head where the tape follows this curvature. It ends when the tape separates from the transducing apparatus at an angle which is tangent to the apparatus. In FIG. 3, this arc length of wrap is indicated with the reference character S in the region 26. It will be explained more fully hereinafter that the transducing apparatus of the invention permits the tape to be fed at small angles of wrap. At the same time, a desired fluid bearing is generated for the larger portion of the apparatus which contains the transducer gaps.

Referring again to FIG. 2, an end view of the transducing apparatus of FIG. 1 is shown in a tape transport system. The tape transport system may be of the type described in Patent No. 2,792,217, which issued to J. A. Weidenheimmer et al., May 17, 1957, and which is assigned to the same assignee as the present application. For purposes of simplicity, the tape transport system does not include all the apparatus of this system and is shown with only a pair of tape reels 31 and 32. The reel 31 normally stores the tape 24 which moves in the direction of the arrow to the reel 32. As is obvious, tape 24 may also move in the reverse direction.

The radius of the head structure 10 at the region of entry 26 is indicated as R1. As is obvious, it is much smaller than the radius R2 of the region 27 containing the transducing gaps. The value of the radius R1 for the desired separation $h^*$ is determined by Formula 1. It has been experimentally determined that the desired bearing can be uniformly and repeatedly achieved if the tape follows the surface of the entry region for some distance before passing over the region 27 where the bearing is sustained. That is to say, the tape should be wrapped about the entry region 26 by some amount. Accordingly, the entry region having the small radius R1 has the tape wrapped about a portion (indicated at S in FIG. 3) of the arc of region 26 to generate a small bearing between the surface 25 and the tape 24 for the extended arc length of the region 27. To obtain the proper arc length S to insure creation of the bearing, the following formula must be satisfied:

$$(2) \qquad 25.5 \leq \frac{S}{h^*}\left(\frac{6\mu V}{T}\right)^{1/3}$$

The parameter S is defined as the arc length of wrap in the region 26 having the smaller radius R1.

The exit radius for the region 33 of the surface 25 is indicated as R3. This radius is only important if the tape moves in the reverse direction from the reel 32 to the reel 31. If the tape moves at the same rate of speed in both directions and all other parameters remain constant, then the radii R1 and R3 should be equal to generate the same air bearing. On the other hand, if the speed in the reverse direction is slower, then R1 should be greater than R3 or the separation $h^*$ between tape 24 and surface 25 will differ. In these instances, it is necessary that the tape exit angle be changed such that the exit region does not form a smaller fluid film. If the tape moves only in the direction indicated by the arrow, it is not necessary that the region 33 be contoured in any particular manner.

Generally, no particular relationship between the parameters R1 and R2 need be satisfied, provided that the transducing apparatus have R2 greater than R1. However, it has been found that if R2 is at least ten times greater than R1 a satisfactory foil bearing is produced and substantially constant bearings are maintained across the entire head structure.

In one particular embodiment of the invention, the radius R1 is approximately .2 inch and the radius R2 approximately 18 inches. If a head structure having such dimensions is formed and used in a tape transport system where the tension exerted on the tape in moving it is about .5 lb. per inch and the velocity of the tape as it moves is 500 inches per second, the equations noted above are satisfied and a satisfactory air bearing is obtained.

While the invention has been particularly shown and described with reference to preferred embodiments thereof, it will be understood by those skilled in the art that various changes in form and details may be made therein without departing from the spirit and scope of the invention. For example, it is apparent that the principles of the invention may be employed in any type of head structure, including single gap, and not just in the two gap read-write head described above.

What is claimed is:

1. In a tape transport system having a record tape moving from a storage reel to a tape-up reel at a predetermined velocity and tension, transducer head apparatus of the foil bearing type comprising head structure formed of pole pieces to define a transducing gap and disposed in a fluid medium having a predetermined viscosity, the head structure having a continuous operating surface including a first portion with a predetermined radius of curvature for first encountering the traversal of the tape and a second portion including the transducing gap and having another predetermined radius of curvature, the radius of the first portion being less than the radius of the second portion, so that when the first portion is encountered by the tape for a predetermined distance a fluid foil bearing is generated by the first portion to carry the tape over the second portion of the head structure at a substantially constant distance from the surface of head structure.

2. In the system of claim 1, wherein the head apparatus employed in the system satisfies the relationship:

$$25.5 \leq \frac{S}{h^*}\left(\frac{6\mu V}{T}\right)^{1/3}$$

where $h^*$ is the distance of the foil bearing, S the predetermined distance encountered by the tape in traversing the first portion of the head structure, $\mu$ the viscosity of the fluid medium and V and T the velocity and tension respectively of the tape as it moves.

3. In a tape transport adapted to process a tape and including a transducer for reading and recording intelligence on said tape and means for moving the tape at a predetermined velocity and tension over a smooth and continuous operating surface on the transducer, said smooth and continuous operating surface including a predetermined contour portion containing a processing zone, the transducer being disposed in a fluid medium of predetermined viscosity and being of the type operable to sustain a constant thickness fluid bearing between the portion of the operating surface containing the processing zone and the tape, the improvement in means for controlling the thickness of said fluid bearing to a thickness independent of the contour of the portion of the operating surface containing the processing zone for said predetermined velocity and tension comprising:

an entry portion formed as a part of said smooth and continuous operating surface spaced from the processing zone and having a radius of curvature determined to create a fluid bearing of predetermined thickness, said radius curvature being different from the contour of the portion of the operating surface containing the processing zone;

and means for directing said tape to pass adjacent said entry portion at a tangent to the surface thereof;

whereby the entry portion creates a fluid bearing of predetermined thickness and the portion of the operating surface containing the processing zone sustains the bearing.

4. The invention defined in claim 3 wherein the means for directing the tape to pass adjacent the entry portion includes means to cause the tape to pass tangent to the surface of the entry portion at a point removed from the portion of the surface containing the operating zone by a distance S, where the distance S has a value satisfying the equation $$25.5 = \frac{S}{h^*}\left(\frac{6\mu V}{T}\right)^{1/3}$$

in which $h^*$ represents the predetermined thickness of the fluid bearing, $\mu$ represents the velocity of the fluid medium, V represents the tape velocity and T represents the tape tension.

5. The invention defined in claim 4 wherein the predetermined thickness $h^*$ of the fluid bearing is determined by the formula $$0.642 = \frac{h^*}{R}\left(\frac{T}{6\mu V}\right)^{2/3}$$

in which R represents the radius of the entry portion, and $\mu$, V and T represent the parameters specified in claim 4.

6. The invention defined in claim 3 wherein the portion of the operating surface of the transducer containing the processing zone is curved uniformly about a first radius and wherein the radius of curvature of the entry portion is substantially smaller than said first radius.

7. The invention defined in claim 3 wherein the operating surface of the transducer has an entry portion at each end of the portion thereof containing the processing zone to provide for creation of controlled thickness bearings for movement of the tape over the operating surface in either direction.

8. The invention defined in claim 7 wherein the radii of curvature of the two entry portions are equal to create equal thickness bearings when the tape is moved in either direction at the same velocity and tension.

9. The invention defined in claim 7 wherein the radius of curvature of the entry portion at one end of the operating surface is different from the radius of curvature of the entry portion at the other end.

References Cited

UNITED STATES PATENTS

| | | | |
|---|---|---|---|
| 2,810,020 | 10/1957 | Schwarz et al. | 179—100.2 |
| 3,075,051 | 1/1963 | Pankratz et al. | 179—100.2 |
| 3,151,796 | 10/1964 | Lipschutz | 179—100.2 |
| 3,170,045 | 2/1965 | Baumeister et al. | 179—100.2 |
| 3,273,896 | 9/1966 | Maeder | 179—100.2 |

BERNARD KONICK, *Primary Examiner.*

V. P. CANNEY, *Assistant Examiner.*

U.S. Cl. X.R.

179—100.2